Patented Dec. 3, 1935

2,022,893

UNITED STATES PATENT OFFICE 2,022,893

RUBBER BONDED ABRASIVE ARTICLE

Richard H. Martin, Worcester, Mass., assignor to Norton Company, Worcester, Mass., a corporation of Massachusetts No Drawing. Application August 31, 1934, Serial No. 742,318

10 Claims. (Cl. 51—280)

This invention relates to abrasive articles, and more particularly to grinding wheels having abrasive grains bonded together by means of hard vulcanized rubber.

Rubber bonded grinding wheels, such as snagging wheels and high speed cut-off wheels, are, in general, made from abrasive grains, such as grains of crystalline alumina or silicon carbide, united together into an integral, shaped article by a bond of hard, vulcanized rubber or ebonite. In the manufacture of hard rubber, which is composed of about two parts rubber and one part sulfur by weight, it is common practice to add to the crude or unvulcanized rubber for use as a bond, small amounts of certain materials, such as organic fillers, mineral oxides, or various fibers which give added strength or heat resistant qualities to the rubber compound, or otherwise secure specific properties thereto. Although the wheels made with these bond compositions have been found to be satisfactory in most cases for the usual types of grinding operations which require extremely high peripheral velocities, they did not show favorable grinding results or heat resistance for certain heavy grinding conditions involving heavy pressure and high frictional heat, and they smoked badly. In the course of such a grinding operation, the considerable heat developed tends to soften the rubber and weaken the bond so that the abrasive grains are readily separated and easily become dislodged from the rubber mass. Thus it was found that the wheels formerly produced containing the prior mineral fillers, such as zinc oxide, ferric oxide and clay mixed in the rubber bond, were slow in cutting rate and of poor grinding quality, although the wheel life and heat resistance were appreciably high. Wheel bonds containing organic fillers, such as asphalt and beeswax, were not suitable for snagging wheels since such substances made soft, weak bonds which were fast-cutting but of low strength and heat resistance. Also, the addition of certain fibers, such as cotton flock and asbestos, to the bonds has been found to weaken the vulcanized bonds although they materially increased their heat resistance. While the addition of these ingredients to the unvulcanized bond has improved the cutting action of the prior rubber bonded grinding wheels more or less, it has been difficult to make a product which has all of the desirable qualities best adapted for snagging or cut-off purposes.

It is accordingly an object of my invention to overcome such difficulties and to provide a rubber bonded grinding wheel which will give a fast rate of cutting, a cool grinding action and low wheel wear under conditions of heavy grinding.

It is another object of the invention to provide a rubber bond which will produce a hard and more durable finished grinding body having superior physical properties, such as higher stress-strain relationship, increased tensile strength and better heat resistant qualities than may be obtained by using the ordinary hard, vulcanized rubber bond.

With these and other objects in view, as will appear from the following disclosure, my invention resides in the composition of matter and the product made therefrom, as set forth in the specification and covered by the claims appended hereto.

As a result of extended investigations, I have discovered that cryolite or any other fluoride substance insoluble in water having similar properties, such as calcium fluoride, apatite and the like, has the peculiar property of forming with rubber or other vulcanizable compound a bond which is more resistant to heat changes and gives unexpected beneficial characteristics to the grinding body, such as better grinding quality, higher tensile and cross-bending strength, and longer life under the operating conditions than has heretofore been obtainable with the rubber bonded wheels of this type constructed in accordance with the commonly accepted practices.

Cryolite is a natural double fluoride of sodium and aluminum and has a composition corresponding to the chemical formula $Na_3AlF_6$ or $3NaF.AlF_3$. This compound occurs in a crystalline form having a specific gravity of 2.90 to 3.00 and a hardness of about 2.5, Mohs scale. The crystals are usually colorless to snow-white. Greenland cryolite containing 13.23% aluminum, 32.71% sodium and some $Mn_2O_3$, MgO, vanadic and phosphoric acids is the important commercial variety.

In accordance with the invention, I form an abrasive article, such as a grinding wheel, by bonding together grains of abrasive, such as crystalline alumina or silicon carbide grains, with a vulcanizable rubber compound, modified by the addition either to the bond or as a coating adhering to the abrasive grains, of an insoluble fluoride substance such as cryolite, which may be either in the natural or synthetic form, and is proportioned for and capable of materially improving the bonding properties of the rubber bond. In practice, I prefer to add the cryolite to the rubber mix; the abrasive grains, sulfur vulcanizing agent and the cryolite being intimately and thoroughly incorporated in the crude or raw rubber mass, as by mechanically mixing therewith, in any desired sequence of steps. Any suitable apparatus may be utilized for this purpose, although I prefer the mixing rolls ordinarily employed in the art. The mixture is then shaped into the form of a grinding wheel, or other abrasive article, and vulcanized under heat and pressure, in accordance with any accepted practice in the art. The amount of such a substance should be governed by the particular type of grinding operation to be performed, a greater amount being used where the grinding operation is apt to develop an excessive amount of heat than where only a slight degree of heating is developed. While the cryolite may be employed, according to my observations, in all amounts up to about 40% by volume of the bond, I find that it may be used to advantage in amounts of from 20% to 40% of cryolite, by volume, in the bond to obtain the better grinding qualities of snagging grinding wheel.

As a specific example of a grinding wheel composition made in accordance with this invention, I may utilize finely divided cryolite having a grain size of 120 meshes to the linear inch or finer, combined with rubber, sulfur and abrasive grain, such as silicon carbide or crystalline alumina, in the following proportions:

| | Parts by weight |
|---|---|
| Abrasive grains (of desired size) | 75.7 |
| Smoked sheet rubber | 6.2 |
| Sulfur | 3.1 |
| Cryolite | 15.0 |
| | 100.0 |

These materials may be combined and shaped into a grinding wheel by suitable means and methods. As an example of one method which may be employed for making such articles, the cryolite, after being ground to a finely divided condition, i. e., such grains as will pass through a screen of 120 meshes to the linear inch, may be combined with the rubber and the other ingredients according to the customary practice well known in the art of making rubber bonded abrasive articles. The crude or raw rubber in sheeted form, commonly termed "smoked sheet", together with abrasive grains of a desired grit size, flour sulfur and cryolite, in the form of a powder or flour, are mixed by passing between mixing rolls, the crude rubber sheet being repeatedly folded and passed between the rolls while the other ingredients, in weighed amounts, are added thereto at desired intervals until an intimate and uniform mixture of the materials is obtained. It is found that the cryolite, from a microscopic examination, seems to be uniformly and thoroughly dispersed through the rubber in finely divided form and the small particles thereof separated by surrounding portions of rubber. The composition is then rolled out into sheets of a desired thickness, as by passing between calender rolls, after which it is cut to the size and form desired. The article thus formed is placed in a vulcanizing mold and vulcanized under heat and pressure in accordance with the accepted practice in the art to form a hard, vulcanized rubber product.

Another method which is feasible for carrying out this invention consists in adding the cryolite so as to provide a surface coating on the abrasive grains, in which case the abrasive grains are first treated with a suitable bonding or cementing material in any suitable manner to produce a surface coating thereon, after which the cryolite material in a finely divided condition is then applied and distributed over the coated grains whereby the cryolite particles are held in the coating and to the grain surfaces. Of the various materials which may be utilized for this purpose, it is preferred to employ certain adhesive bonding materials, such for example, as glue, shellac, rubber in the fluid state, and resinoid bonds, particularly liquid "bakelite", which when mixed with the cryolite particles serve to bond or hold the same in the coating mixture and to the grains. As an illustration of one method of practicing this feature, the cryolite may be added to the abrasive grains by first coating the grains with a layer of liquid "bakelite", then dusting the loose, finely divided cryolite particles over the surface of the coated granules.

In accordance with the present invention, it will be seen that a marked improvement in the properties of the vulcanized rubber abrasive article is brought about by the addition of cryolite or other insoluble fluoride substance either to the rubber bond alone or as a surface coating on the abrasive grains. The invention may also be carried out by the addition of the fluoride agent both in the rubber bond mixture and as a coating on the grains.

The action of the cryolite is difficult to understand, but it would appear that the cryolite in some way affects the bond adjacent to the abrasive grains at the grinding face of the wheel to increase the heat resistance of the rubber and to strengthen it under the momentary softening of the bond under the heat generated in grinding. It is believed that the bond is stiffened sufficiently by the cryolite particles as to maintain a firmer grip on the cutting grains under the heat generated during grinding so that the grains are retained in the cutting surface of the wheel for a longer period and so dull over the cutting edges thereof to form broader cutting surfaces which when presented to the work produce larger chips therefrom; whereas in the prior rubber wheels the cutting ability of the abrasive grains depends solely upon the original sharpness of the cutting edges of the grains which, however, soon become dislodged or covered by the bond, due to its becoming soft at the grinding temperature and smearing over the cutting face of the wheel as to render the cutting points ineffective. In this way, I have provided a new bond for binding the abrasive grains in the desired wheel shape, which has the quality of remaining substantially non-plastic at normal grinding temperatures. Furthermore, by the addition of an insoluble fluoride agent, particularly cryolite, I am able to make a rubber bond which is not only tough and of high tensile strength, but the bond is one which is sufficiently brittle to break away from the grinding surface under the strains and impacts of the grinding operation in a manner comparable with a vitrified ceramic bond to permit fresh cutting surfaces to be presented to the work, thereby resulting in an open wheel structure which is cooler cutting and capable of maintaining better contact and more penetration with the work under the grinding operations than do the prior rubber wheels.

In accordance with this invention, I have provided an abrasive article of this class which is faster cutting and has a higher grinding quality, i. e., the ratio between rate of material removed and rate of wheel wear is higher, than is attained by articles made of the standard rubber bond containing the ordinary mineral fillers. It has been found by tests that a wheel of this type shows less wheel wear and a larger volume of material removed, the latter being the result of the higher percentage of large chips obtained. Also, because of its greater strength and increased heat resistance, the wheel has a much longer operating life than heretofore obtainable with the wheels constructed in accordance with the heretofore commonly accepted practices.

While I have specifically described the manufacture of a grinding wheel composition consisting of rubber, abrasive grains, and cryolite, the invention should not be restricted to the particular materials set forth; and the claims, consequently, should be interpreted in such a manner as to include the basic principles of the invention.

Having thus described my invention, what I claim as new and desire to secure by Letters Patent is:

1. An abrasive wheel comprising a body of abrasive grains united by a bond of hard vulcanized rubber containing an insoluble fluoride incorporated directly therein which is capable of and proportioned for improving the heat-resistance and strength properties of the rubber at normal grinding temperatures.

2. An abrasive wheel comprising a body of abrasive grains integrally united together by a bond of hard vulcanized rubber containing finely divided cryolite incorporated directly therein which coacts with the rubber bond to render it incapable of being readily softened under the heat of grinding to smear over the abrasive grains but will tend to form a bond of greater tenacity and heat resistance for holding the abrasive grains in the body than does plain hard vulcanized rubber and yet will be of sufficient brittleness to readily tear out of the abrading surface of the body to form an open structure, thereby making the wheel fast cutting and cooler acting during a normal grinding operation.

3. An abrasive wheel comprising a body of crystalline alumina grains united by a bond of vulcanized hard rubber containing finely divided cryolite which is incorporated directly therein and in such an amount as to render the bond more heat resistant and incapable of becoming softened at normal grinding temperatures to smear over the abrasive grains.

4. An abrasive wheel comprising a body of abrasive grains united by a bond of hard, vulcanized rubber containing a finely divided, insoluble fluoride material directly incorporated therein which forms not more than 40% by volume of the bond and is proportioned for and is capable of materially improving the heat resistance and strength properties of the bond to render it nonplastic and tough at normal grinding temperatures.

5. An abrasive wheel comprising a body of abrasive grains united by a bond of hard vulcanized rubber containing finely divided cryolite directly incorporated therein which forms from 20% to 40% by volume of the bond.

6. An abrasive article of the type covered by claim 1 in which the insoluble fluoride is calcium fluoride.

7. An abrasive wheel comprising a body of abrasive grains united together by a bond of hard vulcanized rubber containing a supplemental addition agent consisting of finely divided particles of an insoluble fluoride material incorporated directly therein at the point where the rubber is in contact with the abrasive grains, said fluoride particles adhering to the individual abrasive grains as a surface coating thereon and being proportioned for and capable of modifying the rubber bond adjacent to the grains so as to prevent it from being softened under the heat of grinding but will tend to render it non-plastic at normal grinding temperatures and form a bond of greater tenacity for holding the abrasive grains than does plain vulcanized hard rubber, and yet will be of sufficient brittleness to readily tear out of the abrading surface of the body to form an open structure, thereby making the wheel fast cutting and cooler acting during a normal grinding operation.

8. An abrasive wheel of the type covered by claim 7 in which the insoluble fluoride comprises finely divided cryolite particles which are cemented to the surfaces of the abrasive grains by an intermediate layer of an organic bond.

9. An abrasive wheel of the type covered by claim 7 in which the insoluble fluoride comprises finely divided cryolite particles which are cemented to the surfaces of the abrasive grains by an intermediate layer of a resinoid.

10. An abrasive article of the type covered by claim 7 in which the insoluble fluoride is calcium fluoride.

RICHARD H. MARTIN.